United States Patent Office 3,072,676
Patented Jan. 8, 1963

3,072,676
PROCESS FOR PREPARING ETHYLENE MONOTHIOLCARBONATE
Dee Lynn Johnson and Donald L. Fields, Rochester, N.Y., assignors to Eastman Kodak Company, Rochester, N.Y., a corporation of New Jersey
No Drawing. Filed Dec. 2, 1960, Ser. No. 73,183
10 Claims. (Cl. 260—327)

This invention relates to the production of ethylene monothiolcarbonate by a novel and improved method.

The preparation of ethylene monothiolcarbonate

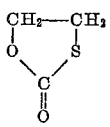

has been described by D. D. Reynolds, J. Amer. Chem. Soc., 79, page 4951 (1957). This process comprises reacting 2-mercapto-ethanol with phosgene in the presence of pyridine employing ethyl acetate as the reaction medium. While this process does provide a means for preparing ethylene monothiolcarbonate, it is pointed out in the above article that considerable polymer is formed as a by-product and that thorough removal of pyridine and pyridine hydrochloride is necessary to avoid decomposition of the ethylene monothiolcarbonate in the step in which the ethyl acetate is removed. Consequently, the reported yield of ethylene monothiolcarbonate is only 48.1%.

We have now found that under acidic influence of organic sulfonic acids, alkyl 2-hydroxyethylthiolcarbonates readily undergo an intramolecular transesterification to give ethylene monothiolcarbonate in yields of 65% or more, and as high as about 80% under the most favorable conditions, with a minimum of polymeric and other by-product materials.

It is, accordingly, an object of the invention to provide a new and improved method for preparing ethylene monothiolcarbonate. Other objects will become apparent from a consideration of the description and claims.

In accordance with the invention, we prepare ethylene monothiolcarbonate by heating an alkyl 2-hydroxyethyl-thiolcarbonate with an organic sulfonic acid such as an alkane, cycloalkane or aromatic sulfonic acid according to the following reaction scheme:

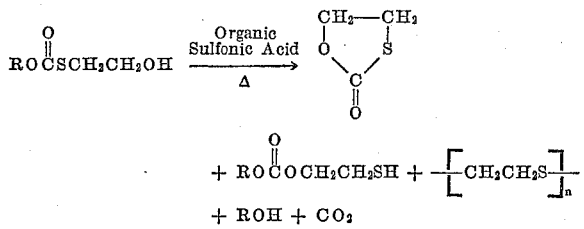

to give a mixture comprising a major proportion of ethylene monothiolcarbonate, a lesser proportion of alkyl 2-mercaptoethylcarbonate, ROC(O)OCH$_2$CH$_2$SH, and some residual polyethylene sulfide, and wherein R represents in each instance an alkyl radical of from 1–6 carbon atoms, e.g., methyl, ethyl, propyl, isopropyl, butyl, hexyl, etc. radicals. When the reaction is complete the ethylene monothiolcarbonate is conveniently separated by fractional distillation. The proportions of the intermediate alkyl 2-hydroxyethylthiolcarbonate and the organic sulfonic acid are critical requiring the reaction to be carried out in the range of from 70.0–99.5 mole percent but preferably from 78.0–98.0 mole percent of the said intermediate and correspondingly from 30.0–0.5 mole percent but preferably from 22.0–2.0 mole percent of the organic sulfonic acid. Amounts less than 0.5 mole percent of the acid result in falling off in yield of the desired ethylene monothiolcarbonate while the time required to complete the reaction becomes extended to several days or more. On the other hand when the amount of the organic sulfonic acid exceeds 30 mole percent, there is a drastic falling off in yield of the ethylene monothiolcarbonate to 50% or less on a weight basis. The temperature of the reaction can be varied quite widely, but the most practical range is from 60–120° C. Advantageously, the reaction may be carried out in an inert nonhydroxylic type of solvent medium, e.g., acetone, ethyl methyl ketone, halogenated hydrocarbons such as chloroform, carbon tetrachloride, ethylene chloride, propylene chloride, etc., benzene, toluene, etc. Benzene is especially appropriate since it forms an azeotrope with water, which is produced when the organic sulfonic acid is employed in the form of a hydrate, and with alcohol and thereby facilitates the removal of these products in the subsequent distillation step for isolating the ethylene monothiolcarbonate from the reaction mixture. Mixtures of one or more of the mentioned solvents with benzene or with each other can be employed. While the reaction may be carried out below or above normal pressures, the preferred procedure is to conduct it under normal atmospheric pressures.

Suitable intermediate alkyl 2-hydroxyethylthiolcarbonates include methyl 2-hydroxyethylthiolcarbonate, ethyl 2-hydroxyethylthiolcarbonate, propyl 2-hydroxyethylthiolcarbonate, isopropyl 2-hydroxyethylthiolcarbonate, butyl 2-hydroxyethylthiolcarbonate, hexyl 2-hydroxyethylthiolcarbonate, etc. These may be prepared by reacting the methyl, ethyl, propyl, isopropyl, butyl, etc., chloroformates with 2-mercaptoethanol in the presence of an alkali metal base such as sodium, potassium or lithium hydroxides. For further details, references may be had to the general process described in copending application of Dee L. Johnson and Delbert D. Reynolds, Serial No. 80,970, filed January 6, 1961.

Suitable organic sulfonic acids may be represented by the general formula:

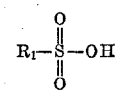

wherein R$_1$ represents an alkyl radical of from 1–10 carbon atoms, e.g., methyl, ethyl, propyl, isopropyl, butyl, sec. butyl, hexyl, octyl, decyl, etc., a monocyclic aryl radical of from 5–7 carbon atoms, e.g., a phenyl radical, a tolyl radical, a xylyl radical, a chlorine or bromine substituted phenyl radical, etc., a polycyclic aryl radical of from 10–12 carbon atoms, e.g., a naphthyl radical which may also be substituted by methyl and halogen, or a cycloalkyl radical such as a cyclopentyl or cyclohexyl radical. etc. Typical organic sulfonic acids coming under the above definitions include methanesulfonic acid, ethanesulfonic acid, propanesulfonic acid, isopropanesulfonic acid, butanesulfonic acid, decanesulfonic acid, benzenesulfonic acid, o-, m- and p-toluenesulfonic acids, xylylenesulfonic acids, o-, m- and p-chlorobenzenesulfonic acids, the dichlorosulfonic acids, cyclopentanesulfonic acid, cyclohexanesulfonic α-napthalenesulfonic acid, β-naphthalenesulfonic acid, etc., which may be further substituted by one or more methyl radicals or chlorine or bromine atoms, and the like. Certain resinous materials having sulfonic acid end groups can also be employed. It will be understood that the mentioned organic acids may also be used in the form of their hydrates, e.g., p-toluenesulfonic acid and the monohydrate thereof may be regarded as equivalents in the process of the invention.

The following example will serve to illustrate further the manner in which we practice our invention.

EXAMPLE 1

A mixture of 750 g. (5.0 moles) of ethyl 2-hydroxyethylthiolcarbonate, B.P. 108° C./5 mm., $n_D^{25}$ 1.4782; 190.5 g. (1.0 mole) of p-toluenesulfonic acid monohydrate and 1.5 l. of benzene was refluxed for 4 hours under an 18″ glass-helices packed distillation apparatus. During this period the benzene-water-alcohol and then the benzene-alcohol azeotropes were continuously distilled at a rate to maintain a stillhead temperature of 70° C.

The reaction mixture was cooled and the polymer formed during the reaction further precipitated by the addition, with stirring, of 1.5 l. of ether. After filtering off the polymer, the acidic filtrate was neutralized with an aqueous sodium carbonate solution (62.0 g., 0.05 mole, of sodium carbonate in 500 ml. of water) and the pH adjusted to about 6 by the addition of 10 ml. of glacial acetic acid. The organic layer was separated, stabilized with 20.0 g. of stearic acid, and distilled under reduced pressure through an 18″ glass-helices packed column to yield 384 g. (73.6 percent) of product, B.P. 75°/10 mm., $n_D^{25}$ 1.5104. To prevent possible contamination of product during distillation, it was found necessary to remove a small amount of white crystalline material identified sa 1,4-dithane (M.P. 105°. Calcd.: C, 40.0; H, 6.7. Found: C, 39.5; H, 6.5.) from the cold finger just prior to the distillation of the ethylene monothiolcarbonate.

EXAMPLE 2

This example follows the general procedure of Example 1 except that the concentration of the p-toluenesulfonic acid monohydrate was only about 2 mole percent and the reaction time was extended to a period of nineteen hours to complete the reaction.

A mixture of 150 g. (1.0 mole) of ethyl 2-hydroxyethylthiolcarbonate, 3.81 g. (0.02 mole) of p-toluenesulfonic acid monohydrate and 500 ml. of benzene was reacted for a nineteen-hour period and the resulting reaction mixture readied for distillation in the manner described in Example 1 for the preparation of ethylene monothiolcarbonate. Four product fractions, none of which were constant boiling, were collected upon distillation of the mixture through a 14″ glass-helices packed column. Analysis of each fraction by iodimetric titration and by infrared spectroscopy indicated the following compositions:

| Fraction | B.P., ° C./ 7 mm. | Refractive Index, $n_D^{25}$ | Amount, grams | Ethylene Monothiolcarbonate, Wt. percent | Ethyl 2-Mercaptoethyl carbonate, Wt. percent |
|---|---|---|---|---|---|
| 1 | 77–84 | 1.467 | 9.6 | 26 | 74 |
| 2 | 84–97 | 1.475 | 9.7 | 43 | 57 |
| 3 | 88–93 | 1.494 | 21.0 | 79 | 21 |
| 4 | 93–95 | 1.504 | 56.8 | 96 | 2 |

From these data, a calculated yield of 77% by weight of ethylene monothiolcarbonate and 11% by weight of ethyl-2-mercaptoethylcarbonate, B.P. 84° C./9 mm., $n_D^{25}$ 1.4522, was obtained, with polyethylene sulfide constituting the balance of the yield as a pot residue.

EXAMPLES 3–6

These examples represent a series carried out according to the general procedure of Example 1, except that in each run the starting mixtures comprised 1.0 mole of ethyl 2-hydroxyethylthiolcarbonate, $x$ moles of p-toluenesulfonic acid and 500 ml. of benzene wherein $x$ values were set at 2, 4, 8 and 16 molar percents. While a considerable variation in rates of reaction was observed at these different catalyst levels, all four runs possessed the common characteristic of having the thiol concentration (presumably ethyl 2-mercaptothiolcarbonate) increase to a maximum in the early part of the run, as checked by iodimetric titrations in absolute alcohol of 2.0 ml. aliquot samples withdrawn from the reaction mixture, and then decrease to a negligible value when given a sufficient reaction time, i.e., 4 hours with the 16 mole percent to 56 hours with the 2 mole percent of the catalyst. A second factor common to these runs was that ethylene monothiolcarbonate at 70–77% by weight yield and residual polyethylene sulfide were isolated to the complete exclusion of ethyl 2-mercaptothiolcarbonate. The ethylene monothiolcarbonate was isolated at the end of each run by distillation through a 14″ glass-helices packed column after filtering off the polymer and neutralizing the acid catalysts as described in the preceding examples. The results are tabulated in the following table.

Table

| Example No. | Catalyst Molar, Percent | Reaction Time, Hrs. | Ethylene Monothiol carbonate, Wt. percent Yield |
|---|---|---|---|
| 3 | 2 | 56 | 77 |
| 4 | 4 | 30 | 78 |
| 5 | 8 | 7 | 74 |
| 6 | 16 | 4 | 70 |

While the above examples have been illustrated with alkanesulfonic acids as represented by p-toluenesulfonic acid, it will be apparent that any other of the mentioned cycloalkane or aromatic sulfonic acids on substitution in the examples will give generally similar results, i.e., yields of ethylene monothiolcarbonate of 65% or more. Also, in place of the alkyl 2-hydroxyethylthiolcarbonate there can be substituted the corresponding aryl 2-hydroxyethylthiolcarbonates wherein the aryl radical contains from 6–10 carbon atoms such as, for example, phenyl 2-hydroxyethylthiolcarbonate, p-tolyl 2-hydroxyethylthiolcarbonate, 1-naphthyl 2-hydroxyethylthiolcarbonate, etc. These intermediates can likewise be prepared by the same general method mentioned previously for preparing the alkyl 2-hydroxyethylthiolcarbonates, i.e., by reacting the corresponding phenyl, tolyl, naphthyl, etc., chloroformates with 2-mercaptoethanol in the presence of alkali metal hydroxides. The use of the above described aryl intermediates in the process of the invention is illustrated by the following example.

EXAMPLE 7

A mixture of 99 g. (0.5 mole) of phenyl 2-hydroxyethylthiolcarbonate, 10 g. (0.05 mole) of p-toluenesulfonic acid monohydrate, and 200 ml. of benzene was refluxed 1 hour under a 14-inch Vigreux column equipped with a variable reflux ratio distillation head. During this time the azeotrope was removed continuously and subsequently the remaining benzene was distilled. Vacuum was then applied to the system to effect the distillation of the theoretical 47 g. of phenol ($n_D^{25}$ 1.5473) and 34 g. (67%) ethylene monothiolcarbonate ($n_D^{25}$ 1.5117).

Ethylene monothiolcarbonate is particularly useful for the preparation of ethylene sulfide, for example, by heating in the presence of a base such as sodium carbonate. It also reacts with various secondary amines to form in toluene at 25° C. the corresponding 2-ethylmercaptocarbamates represented by the general formulas

$$R_2NCO_2CH_2CH_2SH$$

and in water at 25° C. to form the corresponding $R_2NCO_2(CH_2CH_2S)_nH$ and $R_2N(CH_2CH_2S)_nH$ compounds and in toluene at reflux temperature to form the corresponding $R_2NCH_2CH_2SH$ compounds wherein R is alkyl or aryl in each instance as previously defined. Sulfur compounds defined as above are useful also to prepare insecticides, fungicides, etc.

The invention has been described in detail with particular reference to preferred embodiments thereof, but it will be understood that variations and modifications can be effected within the spirit and scope of the invention

What we claim is:

1. A process for preparing ethylene monothiolcarbonate which comprises heating at from 60–120° C. a mixture consisting essentially of from 70.0–99.5 mole percent of an alkyl 2-hydroxyethylthiolcarbonate having the formula:

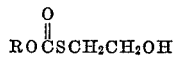

and from 30.0–0.5 mole percent of an organic sulfonic acid having the formula:

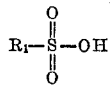

wherein R represents an alkyl radical of from 1–6 carbon atoms and $R_1$ represents an alkyl radical of from 1–10 carbon atoms.

2. A process for preparing ethylene monothiolcarbonate which comprises heating at from 60–120° C. a mixture consisting essentially of from 70.0–99.5 mole percent of ethyl 2-hydroxyethylthiolcarbonate and from 30.0–0.5 mole percent of p-toluenesulfonic acid.

3. A process for preparing ethylene monothiolcarbonate which comprises heating at from 60–120° C. a mixture consisting essentially of from 78.0–98.0 mole percent of ethyl 2-hydroxyethylthiolcarbonate and from 22.0–2.0 mole percent of p-toluenesulfonic acid.

4. The process of claim 3 wherein the reaction is carried out in an inert solvent medium selected from the group consisting of benzene, toluene, acetone, ethyl methyl ketone, chloroform, carbon tetrachloride, ethylene chloride and propylene chloride.

5. The process of claim 3 wherein the reaction is carried out in benzene, wherein the said ethyl 2-hydroxyethylthiolcarbonate is present in amount of 84 mole percent and wherein the said p-toluenesulfonic acid is present in amount of 16 mole percent.

6. The process of claim 3 wherein the reaction is carried out in benzene, wherein the said ethyl 2-hydroxyethylthiolcarbonate is present in amount of 98 mole percent and wherein the said p-toluenesulfonic acid is present in amount of 2 mole percent.

7. The process of claim 3 wherein the said p-toluenesulfonic acid is present in the form of its monohydrate.

8. The process of claim 3 wherein the formed ethylene monothiolcarbonate is separated from the reaction mixture by distillation.

9. A process for preparing ethylene monothiolcarbonate which comprises heating at from 60–120° C. a mixture consisting essentially of from 78.0–98.0 mole percent of phenyl 2-hydroxyethylthiolcarbonate and from 22.0–2.0 mole percent of p-toluenesulfonic acid.

10. A process for preparing ethylene monothiolcarbonate which comprises heating at from 60 to 120° C. a mixture consisting essentially of from 70.0 to 99.5 mole percent of an alkyl 2-hydroxyethyl thiolcarbonate having the formula:

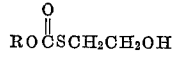

and from 30.0 to 0.5 mole percent of an organic sulfonic acid having the formula:

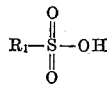

wherein R represents a member selected from the group consisting of an alkyl group of from 1 to 6 carbon atoms, a phenyl group, a tolyl group and a naphthyl group, and $R_1$ represents a member selected from the group consisting of an alkyl group of from 1 to 10 carbon atoms, a phenyl group, a tolyl group, a xylyl group, a naphthyl group, a cyclopentyl group and a cyclohexyl group.

References Cited in the file of this patent

UNITED STATES PATENTS

| | | |
|---|---|---|
| 2,784,201 | Chitwood | Mar. 5, 1957 |
| 2,828,318 | Reynolds | Mar. 25, 1958 |

OTHER REFERENCES

Culvenor et al.: Jour. Chem. Soc. (London), 1946, pp. 1050–52.

UNITED STATES PATENT OFFICE
CERTIFICATE OF CORRECTION

Patent No. 3,072,676 January 8, 1963

Dee Lynn Johnson et al.

It is hereby certified that error appears in the above numbered patent requiring correction and that the said Letters Patent should read as corrected below.

Column 2, line 54, for "radical." read -- radical, --; line 71, for "example" read -- examples --; column 3, lines 6 and 13, for "1.51.", each occurrence, read -- 1.5 1. --; line 20, for "75°/10 mm." read -- 75°/1.0 mm. --; line 23, for "sa" read -- as --; same column 3, in the table, second column line 2 thereof, for "84-97" read -- 84-87 --.

Signed and sealed this 19th day of November 1963.

(SEAL)
Attest:

ERNEST W. SWIDER

Attesting Officer

EDWIN L. REYNOLDS

Acting Commissioner of Patents